Patented May 23, 1933

1,910,815

UNITED STATES PATENT OFFICE

LEO SCHLECHT, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF ACETONE

No Drawing. Application filed January 3, 1930, Serial No. 418,406, and in Germany January 14, 1929.

The present invention relates to improvements in the production of acetone.

In the catalytic production of acetone from acetylene and water with the aid of a catalyst free from alkali metal compounds it may happen that the catalyst, for example after use for a long period of time or on account of faulty maintenance of the temperature or of the velocity of flow of the reaction mixture, yields not only acetone but also acetaldehyde and acetic acid, and usually a part of the acetylene leaves the furnace unchanged. By condensing the reaction product an aqueous solution of acetone, acetaldehyde and acetic acid is obtained the working up of which is troublesome and usually gives rise to difficulties with respect to apparatus on account of the corrosive action of the acetic acid.

I have now found that in such cases pure acetone may be obtained in an advantageous manner by bringing the reaction mixture which contains the undesirable constituents as well as the acetone, either as it leaves the catalyst or after partial or complete condensation of the constituents which are liquid at about room temperature and revaporization, into contact with catalysts consisting of or essentially containing those metals, which term is meant to include the oxides or compounds thereof, the acetates of which decompose on heating with the formation of acetone and which effect the formation of acetone from the undesirable substances such as acetylene, acetaldehyde and acetic acid. The temperatures applied are generally between about 350° and 500° C.

It has also been found that when the reaction mixture is caused to flow over these catalysts with not too small a velocity, for example with about 50 liters of the gaseous mixture per hour and per each liter of the catalyst, the acetone already present remains almost entirely as such while the undesirable substances, such as unchanged acetylene, acetaldehyde and acetic acid, are wholly converted into acetone.

In this manner the recovery of the pure acetone and at the same time the working up and the further employment of the final gases containing hydrogen and carbon monoxide are considerably facilitated and simplified.

As catalysts with which the reaction mixture containing the undesirable constituents is to be brought into contact, are suitable for example oxides of alkaline earth metals, magnesium carbonate or oxide, manganese oxide, zinc or tin oxide, chromium or aluminium oxide or mixtures thereof, or other compounds of the heavy metals preferably in mixture with compounds of the alkaline earth metals and the like. The catalysts are preferably employed in admixture with materials having a good heat conductivity, for example rings of aluminium, iron or chromium-nickel steel, in order to prevent local superheating in the reaction chamber, and if desired other substances may also be present. In contrast to any expectation practically no acetone previously contained in the gaseous mixtures is decomposed by the treatment according to the present invention.

In order to improve the efficiency of the catalysts fresh acetylene and if desired water vapor may also be added to the reaction mixture.

In order to be able to work continuously it is preferable to have three or more reaction furnaces arranged one behind the other, the catalyst in those which for the time being are not in use being regenerated for example with moist air.

The following example will further illustrate the nature of this invention but the invention is not restricted thereto. The parts are by volume.

*Example*

By leading a mixture of 1 part of acetylene and 10 parts of water vapor over a catalyst of zinc oxide at a temperature of 400° centigrade the acetylene is almost entirely converted into acetone at the commencement, but after 21 days or thereabouts, the yield amounts only to about 40 per cent. 20 per cent of the acetylene is then unconverted and from the remainder acetaldehyde and acetic acid are formed. By condensing a sample of the vaporous reaction product an aqueous solution containing about 4 per cent of acetone, 6 per cent of acetaldehyde and 3 per cent of acetic acid is obtained.

If however the reaction mixture leaving the catalyst is led without cooling at 400° C. through a second furnace charged with zinc oxide a yield of 89 per cent of acetone is obtained in accordance with the equations

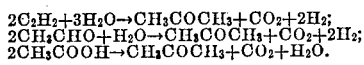

By condensation a solution free from acetaldehyde and containing 12 per cent of acetone and only 0.3 per cent of acetic acid is obtained. Moreover the waste gas is free from acetylene.

What I claim is:—

1. In the catalytic production of acetone from acetylene with the aid of water and of a catalyst free from alkali metal compounds, the step which comprises passing the resulting products containing at least acetylene, acetone, acetaldehyde and acetic acid, at a temperature between about 350° and about 500° C. over a catalytic mass, comprising a metal, the acetate of which decomposes on heating with the formation of acetone.

2. In the catalytic production of acetone from acetylene with the aid of water and of a catalyst free from alkali metal compounds, the step which comprises partially condensing the resulting products containing at least acetylene, acetone, acetaldehyde and acetic acid, and then passing them, after revaporization, at a temperature between about 350° and about 500° C. over a catalytic mass comprising a metal, the acetate of which decomposes on heating with the formation of acetone.

3. In the catalytic production of acetone from acetylene with the aid of water and of a catalyst free from alkali metal compounds, the step which comprises passing the resulting products containing at least acetylene, acetone, acetaldehyde and acetic acid, at a temperature between about 350° and about 500° C. over a catalytic mass comprising a difficultly reducible oxide of a metal the acetate of which decomposes on heating with the formation of acetone.

4. In the catalytic production of acetone from acetylene with the aid of water and of a catalyst free from alkali metal compounds, the step which comprises passing the resulting products containing at least acetylene, acetone, acetaldehyde and acetic acid, at a temperature between about 350° and about 500° C. over a catalytic mass comprising a difficultly reducible oxide of a metal the acetate of which decomposes on heating with the formation of acetone, mixed with a material of good heat conductivity.

5. In the catalytic production of acetone from acetylene with the aid of water and of a catalyst free from alkali metal compounds, the step which comprises passing the resulting products containing at least acetylene, acetone, acetaldehyde and acetic acid, at a temperature between about 350° and about 500° C. over a catalytic mass comprising a difficultly reducible oxide of a metal of the second group of the periodic system the acetate of which decomposes on heating with the formation of acetone.

6. In the catalytical production of acetone from acetylene with the aid of water and of catalysts free from alkali metal compounds the step which comprises passing the resulting products, containing at least acetylene, acetone, acetalydehyde and acetic acid, at about 400° centigrade over a catalytic mass, comprising a metal, the acetate of which decomposes on heating with the formation of acetone.

7. In the catalytical production of acetone from acetylene with the aid of water and of catalysts free from alkali metal compounds the step which comprises passing the resulting products, containing at least acetylene, acetaldehyde and acetic acid, at a temperature between about 350° and about 500° C. over a catalytic mass comprising zinc oxide.

8. In the catalytical production of acetone from acetylene with the aid of water and of catalysts free from alkali metal compounds, the step which comprises passing the resulting products, containing at least acetylene, acetone, acetaldehyde and acetic acid, at about 400° centigrade over a catalytic mass comprising zinc oxide.

9. In the catalytic production of acetone from acetylene with the aid of water and of catalysts free from alkali metal compounds, the step which comprises passing the resulting products containing at least acetylene, acetone, acetaldehyde and acetic acid, at the rate of about 50 litres of the gaseous mixture per hour, at a temperature between about 350° and about 500° C. over each litre of a catalytic mass, comprising a metal, the acetate of which decomposes on heating with the formation of acetone.

In testimony whereof I have hereunto set my hand.

LEO SCHLECHT.